(12) United States Patent
Dellinger et al.

(10) Patent No.: US 12,438,799 B2
(45) Date of Patent: Oct. 7, 2025

(54) ONE WAY LATENCY ESTIMATION WITHOUT CLOCK SYNCHRONIZATION

(71) Applicant: Spirent Communications, Inc., San Jose, CA (US)

(72) Inventors: Timothy John Dellinger, Frederick, MD (US); Joel Padullés Pubill, Barcelona (ES)

(73) Assignee: Spirent Communications, Inc., Santa Clara, CA (US)

( * ) Notice: Subject to any disclaimer, the term of this patent is extended or adjusted under 35 U.S.C. 154(b) by 361 days.

(21) Appl. No.: 18/137,932

(22) Filed: Apr. 21, 2023

(65) Prior Publication Data

US 2023/0344738 A1    Oct. 26, 2023

Related U.S. Application Data

(60) Provisional application No. 63/334,076, filed on Apr. 22, 2022.

(51) Int. Cl.
*H04L 43/06* (2022.01)
*H04L 43/106* (2022.01)

(52) U.S. Cl.
CPC ............ *H04L 43/106* (2013.01); *H04L 43/06* (2013.01)

(58) Field of Classification Search
None
See application file for complete search history.

(56) References Cited

U.S. PATENT DOCUMENTS

| 8,275,175 B2 | 9/2012 | Baltatu et al. |
| 8,711,708 B2 | 4/2014 | Wallman |

(Continued)

FOREIGN PATENT DOCUMENTS

| CN | 106534230 A | 3/2017 |
| EP | 3099016 A1 | 11/2016 |
| WO | 2019012546 A1 | 1/2019 |

OTHER PUBLICATIONS

Yang by example, https://trac.ietf.org/trac/edu/raw-attachment/wiki/IETF94/94-module-2-yang.pdf, Nov. 5, 2015, 35 pages.

(Continued)

*Primary Examiner* — Angela Nguyen
(74) *Attorney, Agent, or Firm* — HAYNES BEFFEL & WOLFELD LLP; Ernest J. Beffel, Jr.

(57) ABSTRACT

A method for determining whether clock skew may exist between a sending node and a remote node during two-way network testing (using protocols such as TWAMP), and a computational method for revising measured latency data to compensate for clock differences.

The method for compensating for clock skew comprises monitoring the network latency between two nodes during a defined time interval. When clock skew is detected, a flag is set, and, after the time interval has completed, clock skew S is estimated using the minimum latency values for the interval. The recorded latency values for the interval are then revised using the calculated clock skew S, and one-way latency results reported.

The improved accuracy can be achieved with only on a few computations after the data have been collected. This a posteriori approach saves on computational resources, which can be at a premium for network testing equipment.

20 Claims, 9 Drawing Sheets

(56) References Cited

U.S. PATENT DOCUMENTS

| | | |
|---|---|---|
| 9,485,165 B2 | 11/2016 | Allan et al. |
| 9,503,344 B2 | 11/2016 | Chakrabarti et al. |
| 9,531,621 B2 | 12/2016 | Kolhi et al. |
| 9,654,370 B2 | 5/2017 | Welin et al. |
| 9,705,769 B1 | 7/2017 | Sarangapani et al. |
| 9,940,151 B2 | 4/2018 | Johnsson et al. |
| 10,613,958 B2 | 4/2020 | Grinkemeyer et al. |
| 10,693,729 B2 | 6/2020 | Menon |
| 10,841,196 B2 | 11/2020 | Menon |
| 10,848,372 B2 | 11/2020 | Menon |
| 10,965,576 B2 | 3/2021 | Mirsky et al. |
| 11,310,678 B2 | 4/2022 | Bedekar et al. |
| 2006/0206724 A1 | 9/2006 | Schaufele et al. |
| 2007/0288552 A1 | 12/2007 | Snyder |
| 2009/0279441 A1 | 11/2009 | Wong et al. |
| 2009/0285575 A1 | 11/2009 | Abidi et al. |
| 2013/0088977 A1 | 4/2013 | Baillargeon |
| 2013/0266195 A1 | 10/2013 | Shiell et al. |
| 2014/0029441 A1 | 1/2014 | Nydell |
| 2014/0029442 A1 | 1/2014 | Wallman |
| 2014/0119221 A1 | 5/2014 | Park et al. |
| 2014/0169183 A1 | 6/2014 | Allan et al. |
| 2014/0211636 A1 | 7/2014 | Robitaille |
| 2014/0226507 A1 | 8/2014 | Bonnier et al. |
| 2014/0258524 A1 | 9/2014 | Thyni et al. |
| 2014/0301215 A1 | 10/2014 | Somoskoi et al. |
| 2015/0056995 A1 | 2/2015 | Baillargeon |
| 2015/0363709 A1 | 12/2015 | Kamei et al. |
| 2016/0026490 A1 | 1/2016 | Johnsson et al. |
| 2016/0028603 A1 | 1/2016 | Chakrabarti et al. |
| 2016/0073279 A1 | 3/2016 | Johnsson et al. |
| 2016/0182340 A1 | 6/2016 | Robitaille et al. |
| 2016/0191367 A1 | 6/2016 | Mirsky et al. |
| 2016/0191632 A1 | 6/2016 | Mirsky et al. |
| 2016/0218927 A1 | 7/2016 | Johnsson et al. |
| 2016/0275248 A1 | 9/2016 | Kim et al. |
| 2016/0352865 A1 | 12/2016 | Gupta et al. |
| 2017/0019323 A1 | 1/2017 | Allan et al. |
| 2017/0289011 A1 | 10/2017 | Johnsson et al. |
| 2017/0346705 A1 | 11/2017 | Szilagyi et al. |
| 2018/0091603 A1 | 3/2018 | Sarangapani et al. |
| 2018/0165693 A1 | 6/2018 | Jain et al. |
| 2018/0167294 A1 | 6/2018 | Gupta et al. |
| 2018/0246803 A1 | 8/2018 | Zhang |
| 2018/0270149 A1 | 9/2018 | Jiao et al. |
| 2018/0375753 A1 | 12/2018 | Mirsky et al. |
| 2019/0059008 A1 | 2/2019 | Liu |
| 2019/0188108 A1 | 6/2019 | Jagannathan |
| 2022/0104206 A1* | 3/2022 | Lee .................. H04W 72/23 |
| 2022/0120915 A1* | 4/2022 | Hoptroff .............. H04J 3/0667 |
| 2023/0091734 A1* | 3/2023 | Reddy ................ H04L 43/0841 370/252 |

OTHER PUBLICATIONS

"TWAMP Explained Measuring Performance in IP Networks", Rad www.rad.com, Sep. 2014, pp. 1-11.

Mirsky, et al., "Two-Way Active Measurement Protocol (TWAMP) Light Data Model", Network Working Group, Jun. 28, 2016, Internet draft valid for 6 months, http://datatracker.ietf.org/drafts/current/, 21 pages.

Clark, "RFC 813 Window and Acknowledgement Strategy in TCP", MIT Laboratory for Computer Science Computer Systems and Communications Group, Jul. 1982, 22 pages.

"RFC 793—Transmission Control Protocol", Darpa Internet Program, Protocol Specification, Sep. 1981, 90 pages.

Civil, et al., "Two-Way Active Measurement Protocol (TWAMP) Data Model", draft-ietf-ippm-twamp-yang-05, Oct. 18, 2017, Internet draft valid for 6 months, http://datatracker.ietf.org/drafts/current/ Draft, 65 pages.

Hedayat, et al., A Two-Way Active Measurement Protocol (TWAMP), Network Working Group, Standards Track, Copyright (c) the IETF Trust (2008), Oct. 2008, 26 pages.

"Zero-touch Network and Service Management—Introductory White Paper", Miscellaneous Contributing Organisations & Authors, available at this link: https://portal.etsi.org/TBSiteMap/ZSM/OperatorWhitePaper, Dec. 7, 2017, 5 pages.

Morton, "RFC 6673 Round-Trip Packet Loss Metrics", ISSN: 2070-1721, AT&T Labs, Internet Engineering Task Force (IETF), https://tools.ietf.org/html/rfc6673, Aug. 2012, 28 pages.

Demichelis, et al., "RFC 3393 IP Packet Delay Variation Metric for IP Performance Metrics (IPPM)", Network Working Group, https://tools.ietf.org/html/rfc3393, Nov. 2002, 42 pages.

Mills, "RFC 1305 Network Time Protocol (Version 3) Specification, Implementation and Analysis", Network Working Group, Electrical Engineering Dept., University of Delaware, mills@udel.edu, Mar. 1992, 115 pages.

"Test and Monitoring Solutions for SDN and DNFV Network Operations", Spirent, spirent.com, Jun. 9, 2016, pp. 1-8.

"ETSI GS NFV-REL 004 V1.1.1", Network Functions Virtualisation (NFV); Assurance; Report on Active Monitoring and Failure Detection, http://www.etsi.org/standards-search, Apr. 2016, pp. 1-61.

Ersue, "ETSI NFV Management and Orchestration—An Overview", IETF #88, Vancouver, Canada, Published E2E Arch, REQ, Use Case, Terminology documents in ETSI NFV Open Area: http://docbox.etsi.org/ISG/NFV/Open/Published/, Jan. 2, 2014, 14 pages.

"RFC 5938—Individual Session Control Feature for the Two Way Active Measurement Protocol (TWAMP)", Internet Engineering Task Force (IETF), Aug. 2010, 17 pages.

"RFC 5357—A Two-Way Active Measurement Protocol (TWAMP)", Network Working Group, Oct. 2008, 26 pages.

"DLPs A300 to A399", Cisco ONS 15454 Procedure Guide Release R5.0, Mar. 2005, 102 pages.

"RFC 7750—Differentiated Service Code Point and Explicit Congestion Notification Monitoring", Internet Engineering Task Force (IETF), Feb. 2016, 11 pages.

U.S. Appl. No. 15/919,039, filed Mar. 12, 2018, U.S. Pat. No. 10,613,958, Apr. 7, 2020, Issued.

U.S. Appl. No. 16/841,623, filed Apr. 6, 2020, U.S. Pat. No. 11,226,883, Jan. 18, 2022, Issued.

U.S. Appl. No. 17/576,676, filed Jan. 14, 2022, U.S. Pat. No. 11,762,748, Sep. 19, 2023, Issued.

U.S. Appl. No. 18/242,505, filed Sep. 5, 2023, 20230409456, Dec. 21, 2023, Pending.

U.S. Appl. No. 15/919,105, filed Mar. 12, 2018, U.S. Pat. No. 10,693,729, Jun. 23, 2020, Issued.

U.S. Appl. No. 16/908,717, filed Jun. 22, 2020, U.S. Pat. No. 11,032,147, Jun. 8, 2021, Issued.

U.S. Appl. No. 17/341,305, filed Jun. 7, 2021, Abandoned.

U.S. Appl. No. 15/919,135, filed Mar. 12, 2018, U.S. Pat. No. 10,848,372, Nov. 24, 2020, Issued.

U.S. Appl. No. 17/103,592, filed Nov. 24, 2020, Abandoned.

U.S. Appl. No. 15/936,346, filed Mar. 26, 2018, U.S. Pat. No. 10,841,196, Nov. 17, 2020, Issued.

U.S. Appl. No. 16/950,790, filed Nov. 17, 2020, U.S. Pat. No. 11,483,226, Oct. 25, 2022, Issued.

U.S. Appl. No. 17/972,386, filed Oct. 24, 2022, U.S. Pat. No. 11,843,535, Dec. 12, 2023, Issued.

* cited by examiner

| Time Stamp | Reported Time (ms) |
|---|---|
| $T_1$ | 108 ms |
| $T_2^*$ | 156 ms |
| $T_3^*$ | 176 ms |
| $T_4$ | 211 ms |

$L^*_{FE} = T_2^* - T_1 = 48$ ms
$T_d = T_3^* - T_2^* = 20$ ms
$L^*_{NE} = T_4 - T_3^* = 35$ ms $T_{RT} = T_4 - T_1 = 103$ ms $L_{RT} = T_{RT} - T^*_d = 83$ ms

| Time Stamp | Reported Time (ms) |
|---|---|
| $T_1$ | 108 ms |
| $T_2^*$ | 310 ms |
| $T_3^*$ | 330 ms |
| $T_4$ | 211 ms |

$L^*_{FE} = T_2^* - T_1 = 202$ ms *  !>
$T_d = T_3^* - T_2^* = 20$ ms
$L^*_{NE} = T_4 - T_3^* = -119$ ms * !>

$T_{RT} = T_4 - T_1 = 103$ ms $L_{RT} = T_{RT} - T_d = 83$ ms (a) Y.1731 ETH-DM    400

```
"result": {
    "address": ["00:10:5E:00:00:10"],
    "avg-jit-far": [1.137],
    "avg-jit-near": [1.071],
    "avg-jit-rt": [1.639],
    "avg-lat-far": [null],
    "avg-lat-near": [null],
    "avg-lat-rfl": [0.7],
    "avg-lat-rt": [6.831],
    "max-jit-far": [3.4],
    "max-jit-near": [3],
    "max-jit-rt": [5.1],
    "max-lat-far": [null],
    "max-lat-near": [null],
    "max-lat-rfl": [1.4],
    "max-lat-rt": [10.3],
    "min-jit-far": [0],
    "min-jit-near": [0],
    "min-jit-rt": [0.1],
    "min-lat-far": [null],
    "min-lat-near": [null],
    "min-lat-rfl": [0.5],
    "min-lat-rt": [4.1],
    "sent": [302],
    "rcvd": [302],
    "lost": [0],
    "ts-in-seq": ["N"]
}
```

(b) TWAMP    440

```
"result": {
    'address': ['1.1.11.0'],
    'avg-jit-far': [0.974],
    'avg-jit-near': [1.455],
    'avg-jit-rt': [1.987],
    'avg-lat-far': [null],
    'avg-lat-near': [null],
    'avg-lat-rfl': [0.01],
    'avg-lat-rt': [5.987],
    'dst-port': [13000],
    'error-msg': None,
    'lost': [0],
    'max-jit-far': [2.1],
    'max-jit-near': [3.9],
    'max-jit-rt': [6],
    'max-lat-far': [null],
    'max-lat-near': [null],
    'max-lat-rt': [9],
    'min-jit-far': [0.0],
    'min-jit-near': [0.0],
    'min-jit-rt': [0.0],
    'min-lat-far': [null],
    'min-lat-near': [null],
    'min-lat-rfl': [0.0],
    'min-lat-rt': [3],
    'outseq': None,
    'rcvd': [600],
    'sent': [600],
    'src-port': [1123],
    'ts-in-seq': ['out-of-sequence']
}
```

(a) Y.1731 ETH-DM 800

```
"result": {
    "address": ["00:10:5E:00:00:10"],
    "avg-jit-far": [1.137],
    "avg-jit-near": [1.071],
    "avg-jit-rt": [1.639],
    "avg-lat-far": [3.285],
    "avg-lat-near": [3.546],
    "avg-lat-rfl": [0.7],
    "avg-lat-rt": [6.831],
    "max-jit-far": [3.4],
    "max-jit-near": [3],
    "max-jit-rt": [5.1],
    "max-lat-far": [5.3],
    "max-lat-near": [5.4],
    "max-lat-rfl": [1.4],
    "max-lat-rt": [10.3],
    "min-jit-far": [0],
    "min-jit-near": [0],
    "min-jit-rt": [0.1],
    "min-lat-far": [1.6],
    "min-lat-near": [1.6],
    "min-lat-rfl": [0.5],
    "min-lat-rt": [4.1],
    "sent": [302],
    "rcvd": [302],
    "lost": [0],
    "ts-in-seq": ["N"]
}
```
— 806, 802, 804

(b) TWAMP 840

```
"result": {
    'address': ['1.1.11.0'],
    'avg-jit-far': [0.974],
    'avg-jit-near': [1.455],
    'avg-jit-rt': [1.987],
    'avg-lat-far': [2.624],
    'avg-lat-near': [3.363],
    'avg-lat-rfl': [0.0],
    'avg-lat-rt': [5.987],
    'dst-port': [13000],
    'error-msg': None,
    'lost': [0],
    'max-jit-far': [2.1],
    'max-jit-near': [3.9],
    'max-jit-rt': [6],
    'max-lat-far': [3.75],
    'max-lat-near': [5.45],
    'max-lat-rfl': [0.0],
    'max-lat-rt': [9],
    'min-jit-far': [0.0],
    'min-jit-near': [0.0],
    'min-jit-rt': [0.0],
    'min-lat-far': [1.35],
    'min-lat-near': [1.35],
    'min-lat-rfl': [0.0],
    'min-lat-rt': [3],
    'outseq': None,
    'rcvd': [600],
    'sent': [600],
    'src-port': [1123],
    'ts-in-seq': ['out-of-sequence']
}
```
— 846, 842, 844

FIG. 8

ONE WAY LATENCY ESTIMATION WITHOUT CLOCK SYNCHRONIZATION

PRIORITY APPLICATION

This application claims the priority to and the benefit of U.S. Provisional Patent Application No. 63/334,076, entitled "ONE WAY LATENCY ESTIMATES WITHOUT CLOCK SYNCHRONIZATION", filed 22 Apr. 2022, which is incorporated by reference for all purposes.

RELATED APPLICATIONS

This application is related with U.S. patent application Ser. No. 15/919,039, entitled "SECURE METHOD FOR MANAGING A VIRTUAL TEST PLATFORM", filed 12 Mar. 2018, which has issued as U.S. Pat. No. 10,613,958 on 4 Apr. 2020.

This application is related with U.S. patent application Ser. No. 15/919,105, entitled "ACCELERATION OF NODE CONFIGURATION FOR TWAMP WITH A LARGE NUMBER OF TEST SESSIONS", filed 12 Mar. 2018, which has issued as U.S. Pat. No. 10,693,729 on 23 Jun. 2020.

This application is related with U.S. patent application Ser. No. 15/919,135, entitled "SCALABILITY, FAULT TOLERANCE AND FAULT MANAGEMENT FOR TWAMP WITH A LARGE NUMBER OF TEST SESSIONS", filed 12 Mar. 2018, which has issued as U.S. Pat. No. 10,848,372 on 24 Nov. 2020.

This application is related with U.S. patent application Ser. No. 15/936,346, entitled "KEY PERFORMANCE INDICATORS (KPI) FOR TRACKING AND CORRECTING PROBLEMS FOR A NETWORK-UNDER-TEST", filed 26 Mar. 2018, which has issued as U.S. Pat. No. 10,841,196 on 17 Nov. 2020.

All the above named applications are incorporated by reference for all purposes as if fully set forth here.

FIELD OF THE TECHNOLOGY DISCLOSED

The technology disclosed relates generally to performance measurement of telecommunication transport networks, and in particular to two-way latency tests between two nodes of the network.

BACKGROUND

Latency is one of the key metrics used to evaluate network performance. When sending and receiving signals in a network, the time delay incurred when sending and receiving signals can make the difference between the perception of a smoothly running network, and an aggravating and disappointing experience.

There are several tests that can be used to measure latency between two nodes of a network. One such test is known as the Two-Way Active Measurement Protocol (TWAMP). In TWAMP, test packets or frames are sent from one network node (typically a client) and reflected off a remote node (often a server). The time consumed in the round-trip transit is measured, and variables such as latency and jitter are tracked over time to monitor congestion and other properties of the network.

TWAMP has been standardized by the Internet Protocol Performance Metrics (IPPM) working group of the Internet Engineering Task Force (IETF) for characterizing the performance measurement of telecommunication transport networks—for measuring two-way, also referred to as round-trip, metrics between network devices. Two-way measurements are common in Internet networks, primarily because synchronization between local and remote clocks is unnecessary for round-trip delay, and measurement support at the remote end may be limited to a simple echo function.

In some circumstances, routes to and from the remote node may take different paths, but the round-trip indicates only the combined delay. Yet different congestion characteristics at different times may be observed for the different paths taken to and from the remote node. When the clock at the remote node is synchronized with the local clock, one-way latency values can also be determined by a test such as the TWAMP test. However, remote clocks can often be synchronized to a different calibration, not synchronized to the local node, and so while the round-trip latency can be accurately known, one-way values for latency cannot be deemed reliable.

There is therefore a need to estimate clock offset between a local and remote node for two-way latency testing, allowing estimation of one-way latency values even in the absence of synchronization between the source node and the remote node.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of the summary is to present some concepts related to some exemplary non-limiting implementations in a simplified form as a prelude to the more detailed description of the various implementations that follow.

The disclosed technology provides methods for determining, in the course of carrying out two-way network testing (using TWAMP or other latency testing protocols), whether clock offset or skew may exist between the clock at the sending node and the clock at the remote node, whether this skew is a significant problem, and, if it is determined to be a problem, provides a computational method for revising the measured latency data to compensate for clock differences.

The method for compensating for clock skew comprises monitoring the network latency results between two nodes. When indications of clock skew are detected, two-way latency measurements over a predetermined time interval are then collected, and the minimum latency values over the time interval determined. Then, using the minimum latency value as an estimate of the inherent latency of the system, the clock skew S consistent with that minimum latency is estimated. The recorded latency values for the interval are then revised using the calculated clock skew S, and one-way latency results reported.

The most apparent advantage to the implementation of the methods disclosed herein is that the reported latency results, once corrected for remote clock skew, are more accurate. However, this accuracy can be achieved not with ongoing computation throughout the data collection, but based only on a few computations using the minimum latency values observed during the entire observation interval. This a posteriori approach, after the collection of data, saves on computational resources, which can be at a premium for network testing equipment.

Improvements can also be made by implementing an a priori approach, where a value for clock skew from one time interval is used to revise latency values reported for one or more subsequent time interval(s).

This may be particularly useful if the clock skew with the remote node is expected to remain unchanging. This reduces the computation required, since the estimation is only done once instead of being repeated for each time interval.

Other aspects and advantages of the technology disclosed can be seen on review of the drawings, the detailed description, and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 4 illustrates a two-way measurement test output for a case when clocks are not synchronized using (a) a Y.1731 ETH-DM test, and (b) a TWAMP test.

FIG. 7 illustrates an example of a table of results calculated according to an implementation of the technology disclosed.

FIG. 8 illustrates a two-way measurement output for the case when clocks are not synchronized from FIG. 4, but after applying an implementation of the invention, for the (a) Y.1731 ETH-DM test, and (b) TWAMP test.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Latency Testing

Telecommunication or Internet Protocol (IP) networks typically comprise many nodes that are interconnected, and communication of data packets or frames between two nodes may follow a number of paths from node to node. In a latency-free network, the instant a packet is sent, it would be received at the destination. In practice, it takes time for the packet to transit the network. Measuring the time it takes to transit the network can provide a useful indicator for network performance. If the network is congested on certain segments, delays may grow.

Figure 1:
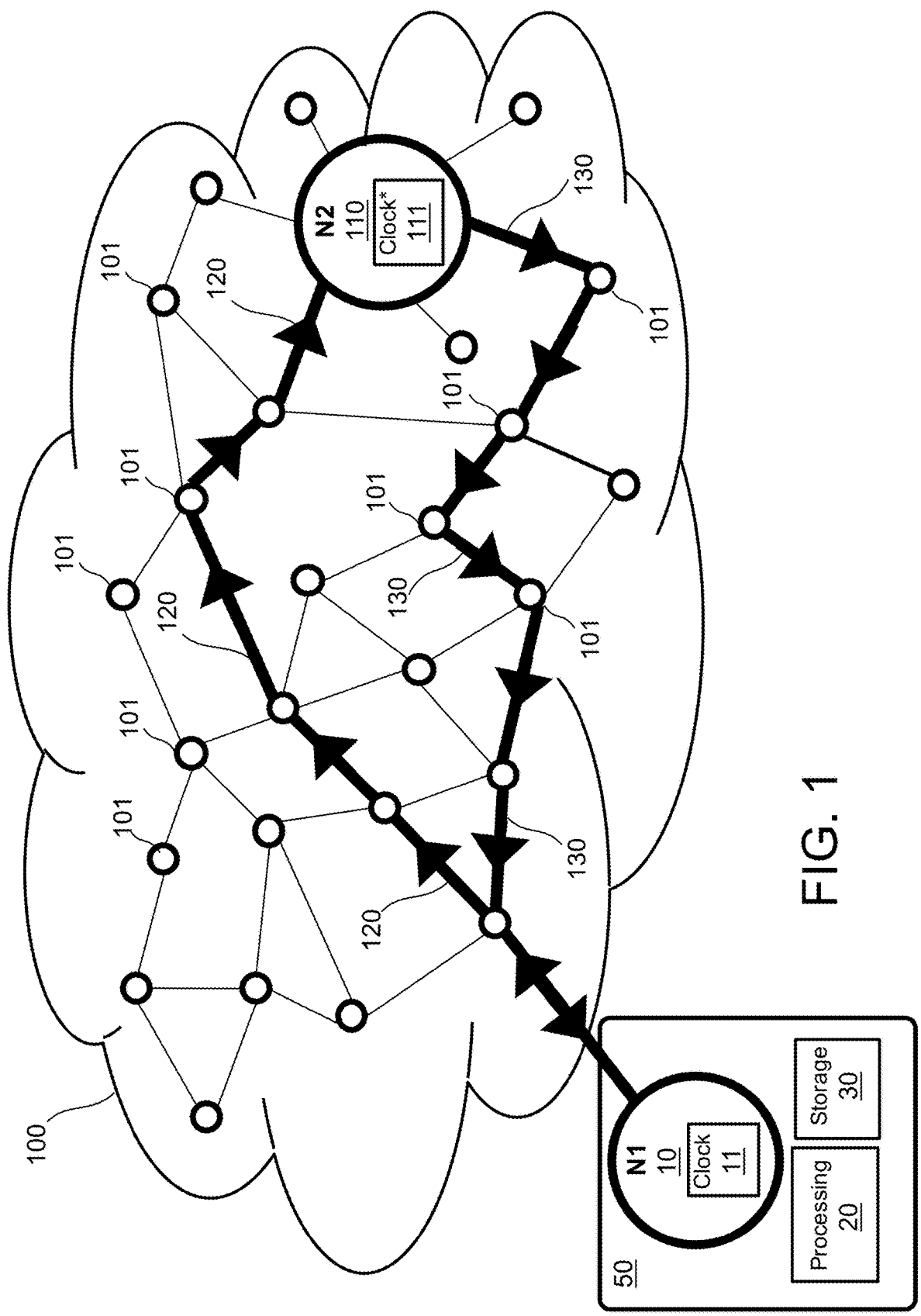
FIG. 1 illustrates a network with a first node N1 and a second node N2, with paths illustrated for a two-way latency test.

FIG. 1 illustrates an example of a communication network 100. The network 100 comprises a number of interconnected nodes 101. A site 50 wishes to use the network 100 to communicate to a remote node N2 110; for example, N1 may be a local client connecting to a gaming site at N2, or N1 may be a video viewer connecting to a streaming service at N2. Node N1 and Node N2 may also both be routers within a network, both communicating with a number of other nodes within the network. The site 50 may additionally have data processing hardware 20 to manage the tests and control signals, and data storage 30 to store results and/or computer programs for testing and analysis. The site 50 establishes a node N1 10 to provide connection to the network 100. The node N1 10 operates according to its own clock 11. The node N2 110 operates according to its own clock 111, and since these clocks may or may not be aligned, an asterisk (*) can be used to mark times from clock* 111.

Network congestion may vary over time, with different delays encountered at different times of the day. For some networks, delays may change minute to minute. Servers in high demand during popular events may slow down, frustrating users—for example, with congestion increasing massively for a ticket sales website as popular tickets go on sale at a particular time. Gamers using multi-player game sites at times of high interaction may encounter screen freezing or stuttering during times of high online lag.

There exist a number of tests that can be used to measure performance in a network. A few examples of these tests include Two-Way Active Measurement Protocol (TWAMP) tests, International Telegraph Union Standardization Sector (ITU-T) Y.1564 tests, and ITU-T Y.1731 tests. TWAMP defines a standard for measuring round-trip network performance among network devices. Key Performance Indicators (KPIs) specified for TWAMP include not only latency, but also jitter, the number of lost packets, and the number of out of sequence packets. More information about TWAMP can be found in the Internet Engineering Task Force (IETF) Request for Comment (RFC) 5357. ITU-T Y.1564 is a test methodology that assesses the proper configuration and performance of an Ethernet service. KPIs measured by Y.1564 testing include bandwidth, latency, frame loss, and packet jitter. ITU-T Y.1731 is a performance monitoring test that measures Ethernet frame delay, frame delay variation, throughput, and frame loss.

Two-way testing between nodes in networks with hundreds of thousands or even millions of nodes can produce computational avalanche of data, especially in high speed networks. For this reason, computations of results these network tests typically produce only summary statistics for a given time interval: minimum values, maximum values, and average (min, max, ave) values. The individual values for timestamps or even packet-to-packet latency are discarded as these summary statistics are updated while the packet data are being collected over a designated time interval.

To test the two-way connection between node N1 10 and node N2 100 as illustrated in FIG. 1, data packets according to a protocol such as TWAMP or Y.1731 ETH-DM are sent into the network over a path 120 between a series of nodes to be finally delivered to the remote node N2 100. The remote node N2 100 then sends a reply message back over a path 130 between a series of nodes to the sending node N1 10.

Although ending path 120 and returning path 130 are shown in FIG. 1 as different for some segments and overlapping in other segments, it should be noted that the routes selected to forward a packet from a node in the network at any given point in time may change, depending on internal programming and local measures of congestion. These routes are therefore not static, and while there are some circumstances in which the sending route 120 and returning route 130 are different, there may be some circumstances where they overlap exactly and are the same.

Transmission of packets or frames by the network even when the paths are identical for sending and receiving still does not guarantee unchanging latency. Network congestion can change moment to moment, especially for high transmission fiber lines (e.g., 400 Gbps). This emphasizes the need to monitor and report network behavior over time, providing information on key performance indicators (KPIs) such as latency, to a network operator, so that properties as a function of conditions such as time of day can be analyzed, and adjustments made to improve performance.

Figure 2:
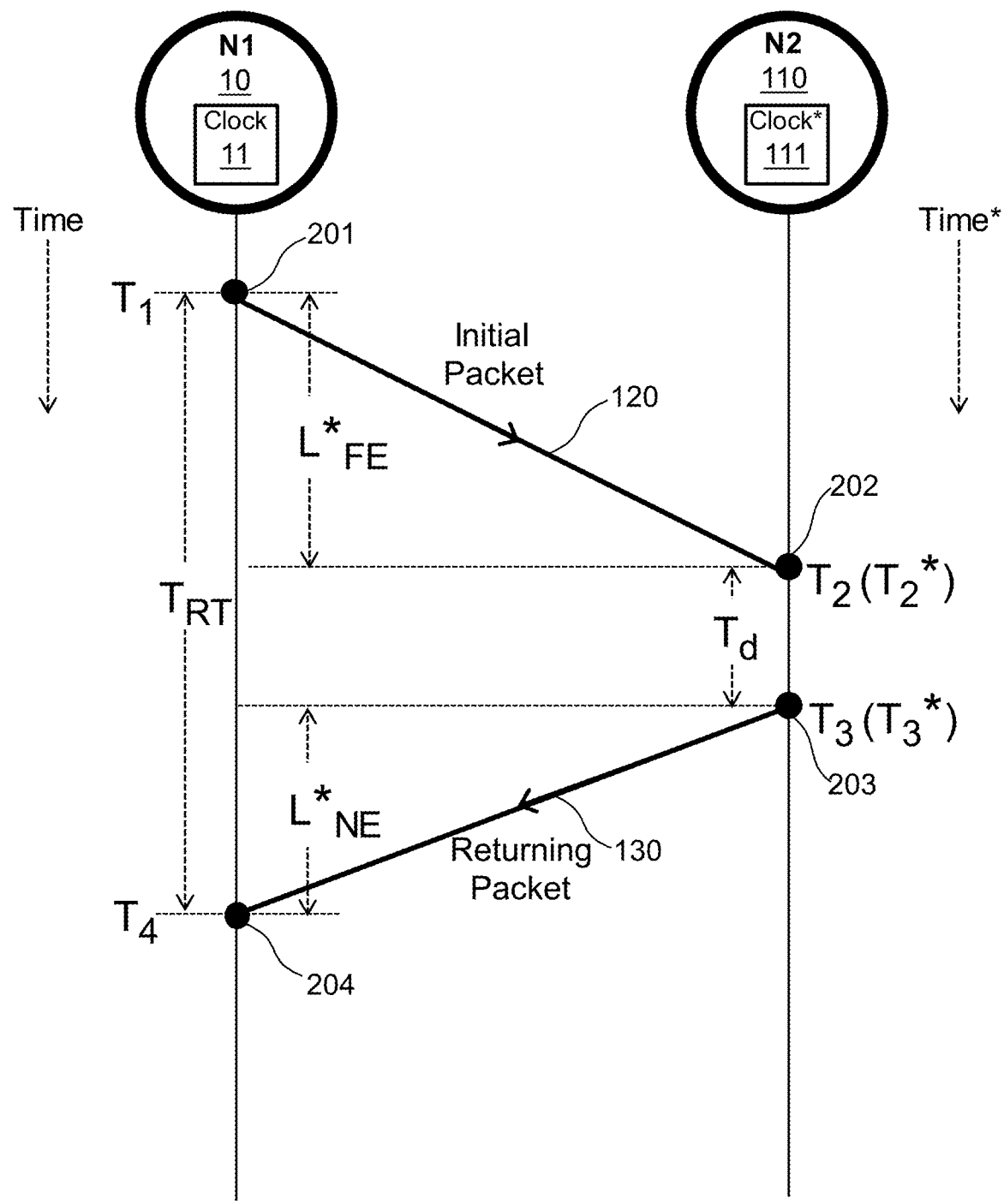
FIG. 2 illustrates a timing diagram for a two-way latency test between a first node N1 and a second node N2.

FIG. 2 illustrates a timing diagram for a latency test according to a protocol such as TWAMP for measuring the latency between node N1 10 and node N2 10. At the initial time $T_1$ 201, the initial packet is sent from N1 10 along the path 120 to N2 100. At a later point in time $T_2$ 202, it arrives at N2 100. After some delay (having a duration denoted by Td) for processing at N2 100, at the next time $T_3$ 203, the return packet is sent from N2 100 along the path 130 to N1 10, where it is received at the final time $T_4$ 204.

In a network where clocks at different nodes are perfectly synchronized with each other and also with universal time, the actual times $T_1$, $T_2$, $T_3$, and $T_4$ will be represented by the values of the timestamps that are in sequence, with $T_1 < T_2 < T_3 < T_4$, and can be trusted to represent the actual times of packet transmission and arrival. However, in practice, timestamps $T_1$ and $T_4$, are made by the clock 11 at node N1 10, while packet timestamps $T_2$ and $T_3$, are made by the clock 111 in node N2 110. These clocks may be out of synchronization with universal time, and may be out of synchronization with each other as well. We therefore designate $T_2$ and $T_3$ in the following by $T_2^*$ and $T_3^*$, to indicate the timestamps are made using the N2 clock 111 which may be offset from the N1 clock 11.

The values for the timestamps that are accumulated at the end of the packet round trip are:

$T_1$: The local clock time the initial packet is sent by N1;
$T_2^*$: The remote clock time the initial packet is received by N2;
$T_3^*$: The remote clock time the return packet is sent by N2;
$T_4$: The local clock time the return packet is received by N1.

This allows automatic computation at node N1 10 of the total round trip time $T_{RT}$, the far-end latency $L^*_{FE}$, the near end latency $L^*_{NE}$, and the round-trip latency $L_{RT}$ with the following definitions:

$$T_{RT} = T_4 - T_1;$$

$$L^*_{FE} = T_2^* - T_1;$$

$$L^*_{NE} = T_4 - T_3^*;$$

$$L_{RT} = L^*_{NE} + L^*_{FE} = (T_4 - T_3^*) + (T_2^* - T_1) = (T_4 - T_1) - (T_3^* - T_2) = T_{RT} - T_d.$$

The corresponding time intervals are illustrated in FIG. 2. Note that asterisks are used to indicate a calculation that mixes time reference frames that are potentially offset. An asterisk * is NOT used for $T_d$, even though it is calculated using times from the N2 clock* 111, because both timestamps are within the same timeframe, and therefore will be internally consistent. $L_{RT}$, even if calculated using values marked with an asterisk, is invariant to the clock offset, and therefore needs no asterisk.

If the remote clock* 111 is synchronized with the local clock 11, even if not aligned with universal time, there is no conflict. Even if the clocks are slightly offset, as long as the timestamps remain in sequence, meaningful relative latency values that reflect network conditions can still be generated.

Figure 3A:
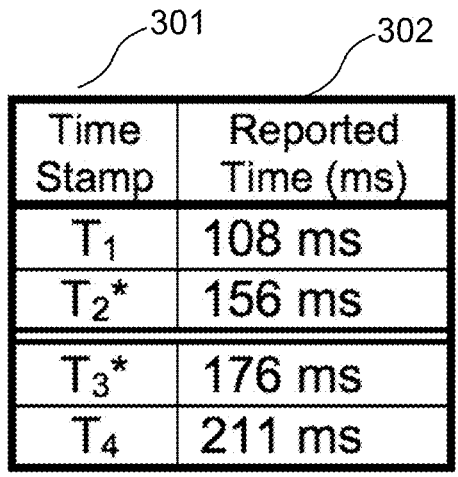
FIG. 3A illustrates a two-way latency measurement result for a case when clocks are synchronized.

This is illustrated in the table of FIG. 3A. In this table, four timestamps for a packet are reported in the first column 301, with the second column 302 containing the corresponding reported time value in milliseconds (ms). The initial packet send time $T_1$ is reported as 108 milliseconds (ms), the remote packet receipt time $T^*_2$ reported as 156 ms, the remote packet send time $T^*_3$ reported as 176 ms (making $T_d$=20 ms), and the final packet receipt time $T_4$ reported as 211 ms. The total round trip time from, and back to, N1 10 is $T_{RT}$=103 ms, and so the total latency is given by:

$$L_{RT} = T_{RT} - T_d = 103 - 20 = 83 \text{ ms}.$$

Note that, in this example, the sending and return latency values are different, with $$L^*_{FE} = 48 \text{ ms} \neq L^*_{NE} = 35 \text{ ms}.$$

This can occur of the outbound path and the return path are different routes through the network, the congestion conditions have changed between the time the packet is sent and returned, or can be due to any number of factors affecting network transit time.

An alternative way of calculating $L_{RT}$ is:

$$L_{RT} = L^*_{NE} + L^*_{FE} = 48 + 35 \text{ ms} = 83 \text{ ms}$$

which agrees with the computation above.

We cannot know if the clocks for the timestamps in FIG. 3A are in fact synchronized, but we know that $T_1 < T_2^* < T_3^* < T_4$, and so we expect meaningful values for latency can be tracked over time. However, if the remote clock* 111 is not synchronized with the local clock 11 and the offset is large, anomalous results can occur.

Figure 3B:
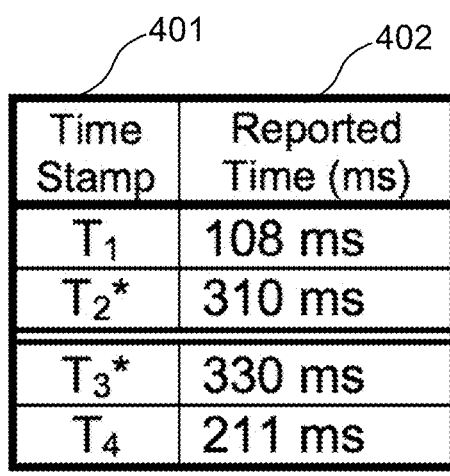
FIG. 3B illustrates a two-way latency measurement result for a case when clocks are not synchronized.

This is illustrated in the table of FIG. 3B. In this table, the same network situation as FIG. 3A is represented, with four timestamps for a packet reported in the first column 401 and the second column 402 containing the corresponding reported time value in milliseconds (ms). But here, the remote clock 111 is out of synchronization by +154 ms. So, while the initial packet send time $T_1$ at 108 ms and the final packet receipt time $T_4$ at 211 ms are the same (making the total round trip time from, and back to, N1 10 and therefore the total latency the same), the times reported by the remote node N2 110 do not appear sequential with the times reported by the local node N1 10. In fact, if the reported numbers were correct, the return packet would travel backwards in time, arriving before it was sent.

In these circumstances, the remote times (as reported) are designated as $T_2^*$ and $T_3^*$. We therefore need note the relative near end and far end latency, given by:

$$L^*_{FE} = T_2^* - T_1;$$

$$L^*_{NE} = T_4 - T_3^*.$$

May be possibly anomalous and need correction.

As mentioned above, two-way testing between nodes in networks with hundreds of thousands or even millions of nodes can produce computational avalanche of data. Since computational resources are at a premium for testing equipment, the results of these tests typically output only summary statistics for a given time interval: minimum values, maximum values, and average (min, max, ave) values.

For latency, the outputs are therefore typically only 6 numbers, even though thousands may have been collected during the time interval:

$$L^*_{FE} (min), L^*_{FE} (max), L^*_{FE} (ave)$$

$$L^*_{NE} (min), L^*_{NE} (max), L^*_{NE} (ave)$$

The individual values for timestamps or even packet-to-packet latency are discarded as these summary statistics are updated while the packet data are being collected over a designated time interval.

Signatures of Asynchronous Clocks

The table in FIG. 3B suggests several indicators that could be used to flag that there are synchronization problems between the sending and reflecting nodes of a network.

One indicator, mentioned above, is that the timestamps that must be chronologically sequential:

$$T_1 < T_2^* < T_3^* < T_4.$$

If this is not true (e.g., $T_1 > T_2^*$, or $T_3^* > T_4$), clock synchronization may be a problem.

Another indicator (mathematically reflecting the same conditions), is that the nominal time to reach the remote node is larger than the total round trip time, a physical impossibility:

$$L_{RT} < L^*_{FE}.$$

Another indicator is that the nominal time for the return signal from the remote node is a negative number, again, a physical impossibility:

$$L^*_{NE} < 0.$$

Other signatures of clock skew or offset may be known to those skilled in the art.

Sample Output with Asynchronous Clocks

FIG. 4 illustrates output from lab examples of output from two-way tests designed to measure latency (lat) and jitter (jit) between two nodes of a network. In the output represented by (a), a Y.1731 ETH-DM (Ethernet delay measurement) test is carried out, while in the output represented by (b), a TWAMP test is carried out.

For the Y.1731 ETH-DM test, an output report 400 is presented. 302 packets are indicated as sent and received, as noted by the lines 402 near the end of the output report 400. However, the local and remote clocks are offset in this test, and the last line 404 of the report 400 indicates the timestamp in sequence ("ts-in-seq") variable has been set to "N" for "NO." The six latency values 406 are therefore "[null]," and cannot be used to provide meaningful latency evaluation of the network.

For the TWAMP test, an output report 440 is presented. 600 packets are indicated as sent and received, as noted by the lines 442 near the end of the output report 440. However, the local and remote clocks are offset in this test, and the last line 444 of the report 440 indicates the timestamp in sequence ("ts-in-seq") variable has been set to "['out-of-sequence']." The six latency values 446 are therefore "[null]," and cannot be used to provide meaningful latency evaluation of the network.

Method for Identifying Asynchronous Clocks

Figure 5:
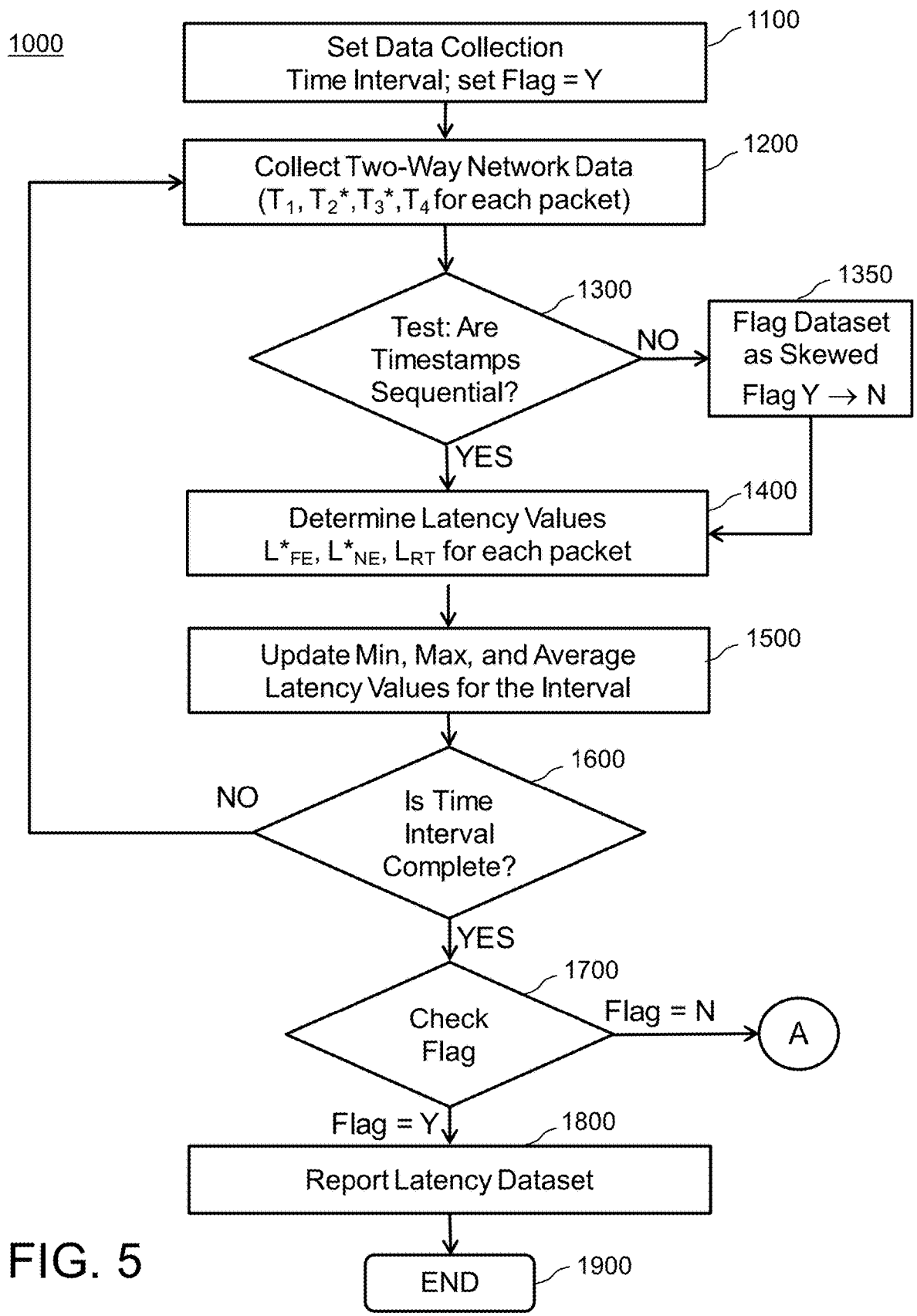
FIG. 5 illustrates a flow diagram for a process to identify whether a two-way latency test is reflecting from a node with a clock that is not synchronized according to an implementation of the technology disclosed.

FIG. 5 illustrates the steps for an example of a process 1000 to identify, from only the values of $T_1$, $T_2^*$, $T_3^*$, and $T_4$, when a latency measurement such as TWAMP data collection may be beset by having asynchronous clocks.

In the first step 1100, the test to measure latency between a designated local node and a remote node is initialized. The flag for timestamps being in sequence is set to "YES" or its equivalent by default.

In the next step 1200, network data $T_1$, $T_2^*$, $T_3^*$, and $T_4$ are determined by sending one or more packets to the remote node, and receiving corresponding return packets.

In the next step 1300, the timestamp data are checked for being out of sequence.

If the timestamp data are sequential, the process proceeds to step 1400. However, if it is not the case that $T_1 < T_2^* < T_3^* < T_4$, in the next step 1350, flag for timestamps being in sequence is changed to "NO" or its equivalent before proceeding to the next step 1400.

In the next step 1400, latency values $L^*_{FE}$, $L^*_{NE}$, and $L_{RT}$ are calculated from the network data. Note that, in some implementations, tests for anomalous timing, such as having $L^*_{FE}$ or $L^*_{NE}$ being a negative number, or having $L^*_{FE}$ or $L^*_{NE}$ being greater than $L_{RT}$ may be the test of being anomalous as an alternative to comparing individual timestamps, and carried out once latencies have been determined. In this case, the corresponding flag to the "timestamps in sequence" flag above would be changed after step 1400, once these latency values have been calculated, and not after step 1300. Other tests may be known to those skilled in the art.

In the next step 1500, the latency values are recorded in local storage. The recorded latency values may typically be only revisions to certain statistics about the network values, such as minimum, maximum, and average values of latency for the data observed within a predetermined time interval, without keeping the packet-by-packet timestamp or latency values. However, in some implementations, data on individual packets could also be retained, if desired.

In the next step 1600, a check is done to make sure the data collection is complete. This may be determined using a number of criteria, including the conclusion of a measurement time interval, the accumulation of a predetermined number of latency results, or by any number of other checks known to those skilled in the art. As implemented in the flowchart of FIG. 5, completion of a time interval indicates the end of the data collection.

If this test step 1600 determines the data collection is not complete, the process returns to the step 1200 and continues to collect network data. However, if this test step 1600 finds data collection is complete, the process moves to the next step 1700.

In step 1700, the flag is checked. If the flag indicating that timestamps are in sequence remains set to "Y" or its equivalent, then historically the (min, max, ave) results for one way latency $L^*_{FE}$ or $L^*_{NE}$ will be included in the results as output in the next step 1800.

Once the process is completed, the process ends at step 1900.

However, if the flag indicating that timestamps are in sequence has been changed to "N" or its equivalent, then a problem may exist.

Historically the (min, max, ave) results for one way latency $L^*_{FE}$ or $L^*_{NE}$ will be set to "[null]," and the output(s) as shown as in FIG. 4 will be produced in step 1800.

Figure 6:
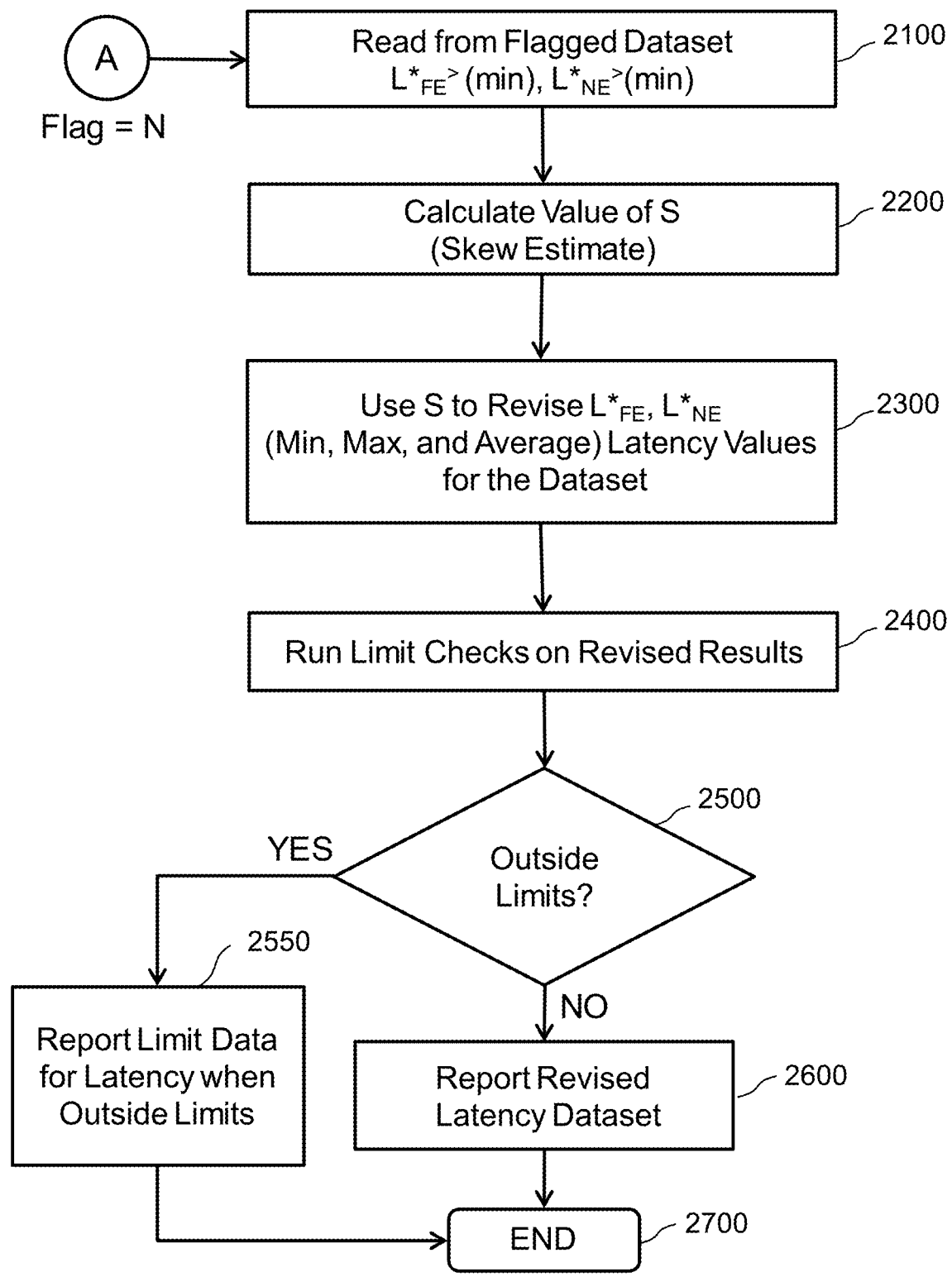
FIG. 6 illustrates a flow diagram for a process to estimate the clock skew for latency results reflecting from a node with a clock that is not synchronized according to an implementation of the technology disclosed.

However, in implementations of the invention, the process proceeds to additional steps, as marked by the circled A in FIG. 5 and again in FIG. 6.

Method for Estimating Clock Skew for a Remote Asynchronous Clock

FIG. 6 illustrates the steps for an example of a process 2000 to calculate and remove remote clock skew from a set of latency measurements.

In the First step 2100, the latency values $L^*_{FE}{}^>$ (min), $L^*_{NE}{}^>$, (from a flagged dataset, noted using the $^>$ flag notation) are read.

In the next step 2200, $L^*_{FE}{}^>$ (min), $L^*_{NE}{}^>$ are used to determine a value for the remote clock offset or skew S. This can be done using the computational technique outlined in the next section of this disclosure.

In the next step 2300, once the estimate of clock offset or skew S for the remote clock has been determined, the stored values for minimum, maximum, and average latency can be revised using the value of S.

In the next step 2400, limit checks on the results can be carried out, to verify that the results revised with the skew calculation are also reasonable. Further description of these limit checks will be described in a later section of this document.

In the next step 2500, a decision is made from the results of the limit checks. If the checks find the results reasonable and the answer is YES, then the process continues to step 2600.

In step 2600, output is produced with the revised latency values for the measured time interval (more on this will be discussed below), and the process ends with step 2700.

However, if the answer to step 2500 is NO, then even though a skew has been estimated, the revised results are deemed as still being anomalous, and the process proceeds to Step 2550.

In step 2550, the latency results that fail the limit check are treated. In some implementations, they may simply be replaced with a "[null]" value, as might have been done in the previous process. However, in some embodiments, and in the process presented in FIG. 6, the out-of-limit result for latency is replaced with the limit value, allowing a numeric value of some kind to be forwarded for these variables in the report After generating the modified report, the process also ends in step 2700.

It should be noted that, as discussed regarding the implementation of FIGS. 5 and 6, the calculation for clock offset/skew correction is carried out entirely with data collected during the predetermined time interval. At the end of the interval, the skew flag, and the values for min/max/ave latency are reset, and in the next time interval for data collection, the need for correction for clock skew is determined from measurements made within the next time interval. In this approach, each data collection time interval is self-contained and independent.

Other implementations, as discussed later, may also be carried out using data from one measurement interval to a later measurement interval.

Computation of Skew (S)

As discussed above, in two-way network latency tests such as TWAMP testing, a packet or frame is sent from a node (e.g., Node N1 10 in the above descriptions) and into the network to a remote node (e.g. Node N2 110 in the above descriptions). The remote node then returns the packet/frame to the sending node.

Four timestamps are recorded at N1: $T_1$, $T_2^*$, $T_3^*$, and $T_4$. If these results for the values for $T_1$ through $T_4$ show anomalies, such as the lack of sequential order, or a negative transit time, or round-trip times shorter than one-way times, it can be assumed there may be a clock skew S, and that the time values collected from the remote node are actually:

$T_2^*$: the N2 clock time the initial packet is received, with $T_2^* = T_2 + S$;

$T_3^*$: the N2 clock time the return packet is sent, with $T_3^* = T_3 + S$;

with $T_2$ and $T_3$ representing equivalent times for $T_2^*$ and $T_3^*$ in the timeframe of the sending node N1.

The values computed for latency are therefore actually:

$$L^*_{FE} = T_2^* - T_1 = (T_2 + S) - T_1 = L_{FE} + S$$

$$L^*_{NE} = T_4 - T_3^* = T_4 - (T_3 + S) = L_{NE} - S;$$

and the latency values we wish to measure, in the timeframe of N1, are:

$$L_{FE} = L^*_{FE} - S$$

$$L_{NE} = L^*_{NE} + S.$$

Normally, from a single packet measurement, S cannot be accurately estimated. However, if we measure packet transmission between two nodes over a designated time interval, there is a greater probability that, for at least one of the packets, and with enough measurement samples over a time window in which network congestion can vary, the transmission times to and/or from the remote packet will each, at some point during the time interval, correspond to the minimum latency between the nodes for the network. In that case:

$$L_{FE} \text{ (min)} \approx L_{NE} \text{ (min)}$$

$$L^*_{FE} \text{ (min)} - S \approx L^*_{NE} \text{ (min)} + S,$$

which means $$L^*_{FE} \text{ (min)} - L^*_{NE} \text{ (min)} \approx 2S$$

and $$S \approx (L^*_{FE} \text{ (min)} - L^*_{NE} \text{ (min)})/2$$

By accumulating the minimum values $L^*_{FE}$ (min) and $L^*_{NE}$ (min) over the duration of the time interval, an estimate for S can therefore be made.

Note that, if $L_{FE}$ (min)≠$L_{NE}$ (min), the recorded results can still be used for calculating S, but some error may be expected.

For example, for the case presented in FIG. 3B, assuming $L^*_{FE}$ (min)=202 ms and $L^*_{NE}$ (min)=−119 ms using the values as shown, $$S \approx (L^*_{FE} \text{ (min)} - L^*_{NE} \text{ (min)})/2 = (202 - (-119))/2 = 321/2 = 160.5 \text{ ms}$$

when the actual clock skew in this example is 154 ms—an error of ~4%.

If, somewhere in the measurement time interval, the measurement of $L^*_{FE}$ (min) actually matched the minimum network transmission time of 35 ms, as was shown in FIG. 3B for $L^*_{FE}$ (min), then $L^*_{FE}$ (min) in this example would be 189 ms, while $L^*_{NE}$ (min) would remain −119 ms, making the skew:

$$S \approx (L^*_{FE}(\min) - L^*_{NE}(\min))/2 = (189-(-119))/2 = 308/2 = 154 \text{ ms}$$

which is exactly right.

Intervals for time windows to collect latency measurements will have higher accuracy if intervals are selected that lead to larger samples of data being observed. Then, the probability of at least one of the observed latency values approaches the system minimum is higher, due to a greater chance of at least one packet encountering a network during a moment of low congestion. The exact conditions in a network may vary minute to minute, or even second to second, so intervals of some length (e.g., minutes) at relatively high sample sizes (several or many per second) may be desired to sample over the typical fluctuations in the network.

Once obtained, this estimate for S can then be used in revising the collected values of $L^*_{FE}$ and $L^*_{NE}$ accumulated over the interval, and then determining the min, max, and average values from the revised latency numbers.

If more computational efficiency is desired, the estimate for S can be used only to revise the final values to be reported at the end of the interval, representing just the minimum, maximum, and average values of latency for the time interval, without calculating revisions for the entire dataset:

$$L_{FE}(\min) = L^*_{FE}(\min) - S$$

$$L_{FE}(\min) = L^*_{FE}(\max) - S$$

$$L_{FE}(\text{ave}) = L^*_{FE}(\text{ave}) - S$$

$$L_{NE}(\min) = L^*_{NE}(\min) + S$$

$$L_{NE}(\max) = L^*_{NE}(\max) + S$$

$$L_{NE}(\text{ave}) = L^*_{NE}(\text{ave}) + S.$$

Once these revised numbers are calculated, limit checks may be run to ensure that the revision using S is reasonable. These limit checks may include:

Checking the revised values of $L_{FE}$ (min) and $L_{NE}$ (min) are both ≥0;
Checking the revised values of $L_{FE}$ (min) and $L_{NE}$ (min) are both ≤$L_{RT}$ (min);
Checking the revised values of $L_{FE}$ (max) and $L_{NE}$ (max) are both ≤$L_{RT}$ (max);
Checking the revised values of $L_{NE}$ (ave)≥$L_{NE}$ (min);
Checking the revised values of $L_{NE}$ (ave)≤$L_{NE}$ (max);
Checking the revised values of $L_{FE}$ (ave)≥$L_{FE}$ (min);
Checking the revised values of $L_{FE}$ (ave)≤$L_{FE}$ (max).

A Calculation Example

Figure 7:
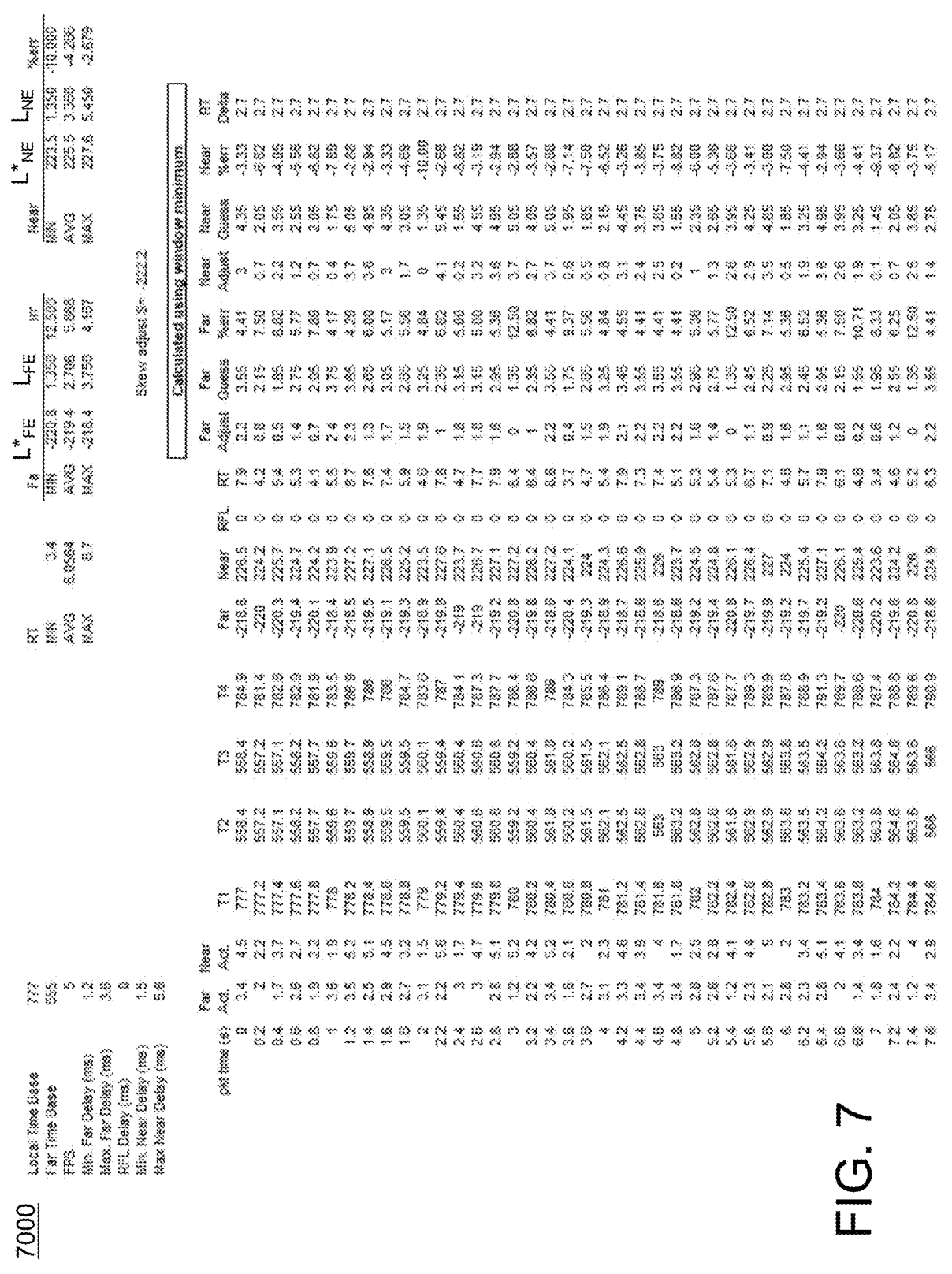

FIG. 7 illustrates a table 7000 of example calculations according to the methods disclosed herein, representing TWAMP packet transmissions between a near network node and a far network node. The TWAMP simulation represented in the table has packets sent every 0.2 sec, or at 5 frames per second (FPS), with the first packet being sent with a timestamp of 777 ms. For this example, when the local node shows a time of 777 ms, the remote node shows a time of 555 ms, and so the far node has a clock skew of −222 ms relative to the near node. Packets are The columns in the table represent the following variables:

Pkt time(s): An objective time for sending the packets at 5 frames/sec, starting at 0 sec.
Far Act.: The actual latency $L_{FE}$ between the near node and the far node for a sent packet, generated in the table by a random number generator.
Near Act.: The actual latency $L_{NE}$ between the far node and the near node for a return packet, generated in the table by a random number generator.
T1, T2, T3, T4: Timestamps $T_1$, $T_2^*$, $T_3^*$, $T_4$ as reported by the near and far nodes.
Far: Far end latency $L^*_{FE} = T_2^* - T_1$.
Near: Near end latency $L^*_{NE} = T_4 - T_3^*$.
RFL: The delay at the far end $T_d = T_3^* - T_2^*$.
RT: The round-trip latency $L_{RT} = (T_4 - T_1) - T_d$.

The disclosed method scans the entire column of values for "Far" ($L^*_{FE}$), and finds the minimum value—in this case, a value of −220.8 ms. Therefore, as shown in the left set of summary results in the upper right of FIG. 7, $$L^*_{FE}(\min) = -220.8.$$

Likewise, the disclosed method scans the entire column of values for "Near" ($L^*_{NE}$), and finds the minimum value—in this case, a value of 223.5 ms. Therefore, as shown in the right set of summary results in the upper right of FIG. 7, $$L^*_{NE}(\min) = +223.5.$$

According to the formula derived above, $$S \approx (L^*_{FE}(\min) - L^*_{NE}(\min))/2 = ((-220.8) - 223.5)/2 = -444.3/2 = -222.15 \text{ ms}$$

which is close to the actual skew in this example of −222.0 ms. Note that, for this dataset, $$L^*_{FE}(\min) \neq L^*_{NE}(\min)$$

and so some error is to be expected. However, latency values, previously categorically impossible (e.g., negative latencies, or one-way latencies longer than the round-trip time) and therefore unreportable, are now much more reasonable, and can be reported (with some caveats) as a monitor of network behavior and performance.

The columns of revised values in the table of FIG. 7 are:
Far Adjust: $= L^*_{FE} - L^*_{FE}(\min) = L^*_{FE} + 220.8$.
Near Adjust: $= L^*_{NE} - L^*_{NE}(\min) = L^*_{NE} - 223.5$.
RT Delta: $= L_{RT} - (\text{Near Adjust}) - (\text{Far Adjust}) = L_{RT} - L^*_{NE} - L^*_{FE} - (-223.5) - 220.8 = L_{RT} - L^*_{NE} - L^*_{FE} + 2.7 = +2.7$.
Far Guess(LFE): $= (\text{Far Adjust}) + (\text{RT Delta}/2) = L^*_{FE} + 220.8 + (2.7/2) = L^*_{FE} + 222 = L^*_{FE} + S$.
Far % Err: $= ((\text{Far Guess}) - (\text{Far Act}))/(\text{Far Act})$ in percent (i.e. ×100).
Near Guess($L_{NE}$): $= (\text{Near Adjust}) + (\text{RT Delta}/2) = L^*_{NE} - 223.5 + (2.7/2) = L^*_{NE} - 222 = L^*_{NE} - S$.
Near % Err: $= ((\text{Near Guess}) - (\text{Near Act}))/(\text{Near Act})$ in percent (i.e. ×100).
Near Adjust: $= L^*_{NE} - L^*_{NE}(\min) = L^*_{NE} - 223.5$.

Sample Output with Asynchronous Clocks Using S

FIG. 8 illustrates output from the same lab examples of output from two-way tests between two nodes of a network as were shown in FIG. 4. In the output represented by (a), the Y.1731 ETH-DM test is carried out, while in the output represented by (b), the TWAMP test is carried out, but now using the clock skew compensation method described above.

As before, for the Y.1731 ETH-DM test, an output report 800 is presented. 302 packets are indicated as sent and received, as noted by the lines 802 near the end of the output report 800. As before, the local and remote clocks are offset in this test, and the last line 804 of the report 800 still indicates the timestamp in sequence ("ts-in-seq") variable has been set to "N" for "NO."

However, using the methods disclosed above to compensate for clock skew, the six latency values 806 are no longer "[null]," but have values that can be used to provide meaningful latency evaluation of the network.

Likewise, for the TWAMP test, an output report 840 is presented. 600 packets are indicated as sent and received, as noted by the lines 842 near the end of the output report 840. As before, the local and remote clocks are offset in this test, and the last line 844 of the report 840 indicates the timestamp in sequence ("ts-in-seq") variable is still set to "['out-of-sequence']."

However, using the methods disclosed above to compensate for clock skew, the six latency values 846 are no longer "[null]," but have values that can be used to provide meaningful latency evaluation of the network.

Advantages of the Approach

Using these methods to estimate remote clock skew has the obvious advantage of being able to present more accurate results for latency in more circumstances. However, using the disclosed technology for the estimation of S and revising the latency values has additional advantages for cost and efficiency.

When the testing node is a piece of home-installed equipment, such as virtual test platforms (VTPs) running virtual test application (VTA) software, the installed equipment is typically designed to provide computation and functionality at minimal cost, and therefore lower capacity processors and smaller memory storage devices may be used. There is therefore a premium on using software and algorithms that can utilize the sparser computational resources efficiently. Running revisions throughout the latency measurement cycle could cause significant strain the computational resources during the data acquisition period, and require the use of additional storage for the original and revised results.

The methods presented in this disclosure relieve these problems by performing computation once, after the fact, or a posteriori, using only minimum values of measured latency to estimate clock skew, and then revising only the minimum, maximum, and average latency values for the time interval needed for reporting.

This avoids using computing cycles for revising the raw data as it is collected. For a dataset of latency values collected at 10 per second over a standard 5 minute interval, the reduction in computation comparing in-line vs. a posteriori is greater than a factor of 3,000, equal to the number of samples collected.

When testing latency between nodes where the testing node is a server and not a home-installed device, although cost for computational resources may not be as limited, the ability to carry out computations after the fact, and in some cases, dedicating the computations to use one of the microprocessor cores dedicated to running management software for the server, avoids the interference that making these corrections to latency might cause to the routine testing operations of the server.

Variations

Running Estimate Approach

In some situations, it may be advantageous to keep a running estimate of S as the latency values are being collected, and revise the latency numbers "on the fly" with the current best estimate of S.

This can have the effect of more immediate correction, especially if there is suspicion that the clock skew at the remote node is not constant. However, more computations are needed to keep up with the steady revisions to S determined from the incoming measurements of latency.

A Priori Approach

In some situations, it may be advantageous to initially monitor latency over a predetermined time window and compute a value for S using the computation methods outlined in the previous sections. Then, instead of revising latency values already collected, this value for S is used to revise latency values reported for one or more subsequent time interval(s).

This may be particularly useful if the clock skew of the remote node is expected to remain unchanging, and therefore a single estimation of S can be used to revise latency values for many following measurement intervals. This reduces the computation required, since the estimation is only done once instead of being repeated for each interval.

This can have a computational advantage, but will be accurate only if the initial window used to estimate S collects latency data during enough variation in network congestion that the clock skew S can be accurately estimated for the future intervals as well.

Combined A Posteriori & A Priori Approach

In some situations, a combination of both a posteriori and a priori approaches may be used. First, once the indications of clock skew are detected, latency is measured over a predetermined time interval, and the value for S estimated at the end of the interval. Then, at the end of the interval, the results from the just measured interval are revised, to reflect the just measured value for S. Then, for subsequent measurement time intervals, latency measurements are collected and revised using this single value of S without revision, or additional computation of new values of S.

This has the dual advantage of revising the results from the initial dataset as well, increasing accuracy, while also revising and improving the values for subsequent time intervals.

Computer Implementation

Figure 9:
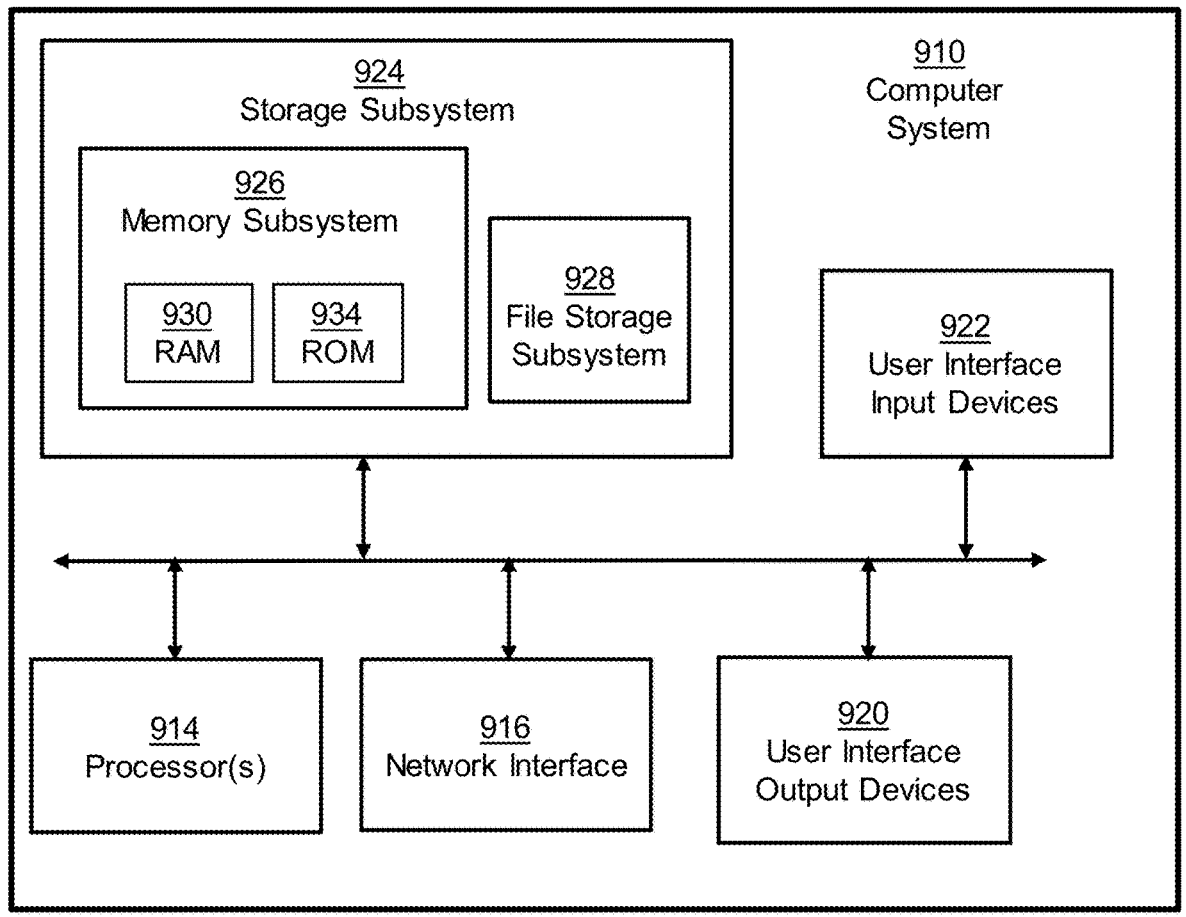
FIG. 9 is a block diagram of an exemplary system that may be used for implementation of the technology disclosed.

FIG. 9 is a block diagram of an example computer system, according to one implementation, which may be used for executing the tests described above. One or more such computer systems can be used to implement some or all of the algorithms and methods for the technology disclosed herein.

Computer system 910 typically includes at least one processor 914 that communicates with a number of peripheral devices via bus subsystem 912. These peripheral devices may include a storage subsystem 924 including, for example, memory devices and a file storage subsystem, user interface input devices 922, user interface output devices 920, and a network interface subsystem 916. The input and output devices allow user interaction with computer system 910. Network interface subsystem 916 provides an interface to outside networks, including an interface to corresponding interface devices in other computer systems.

User interface input devices 922 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 910.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 910 to the user or to another machine or computer system.

Storage subsystem 924 stores programming and data constructs that provide the functionality of some or all of the modules and methods described herein. These software modules are generally executed by processor 914 alone or in combination with other processors.

Memory 926 used in the storage subsystem can include a number of memories including a main random access memory (RAM) 930 for storage of instructions and data during program execution and a read only memory (ROM) 932 in which fixed instructions are stored. A file storage subsystem 928 can provide persistent storage for program and data files, and may include computer readable media such as a hard disk drive, a floppy disk drive along with associated removable media, a CD-ROM drive, an optical drive, or removable media cartridges. The modules implementing the functionality of certain implementations may be stored by file storage subsystem 928 in the storage subsystem 924, or in other machines accessible by the processor.

Bus subsystem 912 provides a mechanism for letting the various components and subsystems of computer system 910 communicate with each other as intended. Although bus subsystem 912 is shown schematically as a single bus, alternative implementations of the bus subsystem may use multiple busses.

Computer system 910 can be of varying types including a workstation, server, computing cluster, blade server, server farm, or any other data processing system or computing device. Due to the ever-changing nature of computers and networks, the description of computer system 910 depicted in FIG. 9 is intended only as one example. Many other configurations of computer system 910 are possible having more or fewer components than the computer system depicted in FIG. 9.

Additional Implementations

In addition to the computer implementations disclosed above, implementations of the methods and technology disclosed herein can be applied in software modifications and versions for any software package collecting latency data using standard protocols such as TWAMP or Y.1731 ETH-DM. Modifications can be distributed to routers or test equipment, such as virtual test platforms (VTPs), that have software for communicating over communication networks using such protocols.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

In another implementation, a disclosed system includes one or more processors coupled to memory, the memory impressed with computer instructions, the instructions, when executed on the processors, implement actions of the disclosed method described herein.

In yet another implementation a disclosed tangible non-transitory computer readable storage medium impressed with computer program instructions that, when executed on a processor, implement the disclosed method described herein.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

While the technology disclosed is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:

1. A method for revising latency measurements in a communication network comprising at least two nodes, a near node and a far node, comprising:
   sending time stamped data from the near node to the far node, receiving corresponding return time stamped data at the near node from the far node during a defined time interval and time stamping the data received;
   determining minimum, maximum, and average values for both far end latency and near end latency from the time stamped data received from the far node over the defined time interval;
   calculating a clock offset for the far node relative to the near node using a minimum value for far end latency and a minimum value for near end latency;
   determining revised minimum, maximum, and average values for far end latency and near end latency from the previously determined values using the calculated clock offset; and
   reporting the revised minimum, maximum, and average values for far end latency and near end latency to a network operator to indicate network performance corresponding to the defined time interval.

2. The method of claim 1, wherein:
the time stamped data sent from the near node to the far node comprises data packets formatted according to a standard latency testing protocol.

3. The method of claim 2, wherein:
the standard latency testing protocol is one of a Two-Way Active Measurement Protocol (TWAMP) or a Y.1731 ETH-DM test.

4. The method of claim 1, further comprising:
the steps of sending time stamped data and of determining values for latency occur repeatedly within the defined time interval.

5. The method of claim 1, wherein:
the defined time interval corresponds to a predetermined network performance reporting interval.

6. The method of claim 1, wherein:
the defined time interval is less than or equal to 5 minutes in duration.

7. The method of claim 1, wherein:
the calculation of the clock offset, and
the determination of the revised minimum, maximum, and average values for the far end latency and the near end latency using the calculated clock offset,
occur after the defined time interval has ended.

8. The method of claim 1, additionally comprising:
conducting limit checks on the revised minimum, maximum, and average values for the far end latency and the near end latency.

9. The method of claim 8, wherein:
the limit checks comprise at least one of:
checking that the revised values of $L_{FE}$ (min) and $L_{NE}$ (min) are both $\geq 0$;
checking that the revised values of $L_{FE}$ (min) and $L_{NE}$ (min) are both $\leq L_{RT}$ (min);
checking that the revised values of $L_{FE}$ (max) and $L_{NE}$ (max) are both $\leq L_{RT}$ (max);
checking that the revised values of $L_{NE}$ (ave) $\geq L_{NE}$ (min);
checking that the revised values of $L_{NE}$ (ave) $\leq L_{NE}$ (max);
checking that the revised values of $L_{FE}$ (ave) $\geq L_{FE}$ (min);
checking that the revised values of $L_{FE}$ (ave) $\leq L_{FE}$ (max).

10. The method of claim 1, wherein:
the calculation of the clock offset for the far node relative to the near node uses a minimum value for far end latency and a minimum value for near end latency from a time interval prior to the defined time interval.

11. The method of claim 1, wherein:
the calculation of the clock offset for the far node relative to the near node uses a minimum value for far end latency and a minimum value for near end latency from the defined time interval.

12. The method of claim 11, wherein:
the calculation of the clock offset occurs after completion of the defined time interval.

13. The method of claim 1, additionally comprising:
during a prior time interval occurring before the defined time interval,
sending time stamped data from the near node to the far node, and receiving corresponding return time stamped data at the near node from the far node;
determining minimum, maximum, and average values for both far end latency and near end latency from the time stamped data received from the far node over the prior time interval; and
checking for anomalies in timestamped data and the minimum, maximum, and average values for the far end latency and the near end latency when compared to round trip latency.

14. The method of claim 13, wherein:
the step of checking for anomalies comprises at least one of:
checking that the timestamps are sequential; or
checking that both far end latency and near end latency are less than round trip latency; or
checking that neither far end latency or near end latency have negative values.

15. The method of claim 13, wherein:
the time stamped data sent from the near node to the far node during the prior time interval comprises data packets formatted according to a standard latency testing protocol.

16. The method of claim 15, wherein:
the standard latency testing protocol is one of a Two-Way Active Measurement Protocol (TWAMP) or a Y.1731 ETH-DM test.

17. The method of claim 1, wherein:
the reporting of the revised minimum, maximum, and average values for far end latency and near end latency to a network operator,
comprises displaying the latency results on a screen connected to the near node.

18. The method of claim 1, wherein:
the reporting of the revised minimum, maximum, and average values for far end latency and near end latency to a network operator,
comprises sending a report to a remote location through the Internet.

19. A system comprising:
memory;
one or more processors coupled to the memory, the memory being loaded with computer instructions to test a communications network comprising at least two nodes, a near node and a far node, the computer instructions, when executed on the one or more processors, implement operations comprising:
sending time stamped data from the near node to the far node, receiving corresponding return time stamped data at the near node from the far node during a defined time interval and time stamping the data received;
determining minimum, maximum, and average values for both far end latency and near end latency from the time stamped data received from the far node over the defined time interval;
calculating a clock offset for the far node relative to the near node using a minimum value for far end latency and a minimum value for near end latency;
determining revised minimum, maximum, and average values for far end latency and near end latency from the previously determined values using the calculated clock offset; and
reporting the revised minimum, maximum, and average values for far end latency and near end latency to a network operator to indicate network performance corresponding to the defined time interval.

20. A non-transitory computer readable storage medium impressed with computer program instructions to test a communications network comprising at least two nodes, a near node and a far node, the computer instructions, when executed on one or more processors, implement operations comprising:
- sending time stamped data from the near node to the far node, receiving corresponding return time stamped data at the near node from the far node during a defined time interval and time stamping the data received;
- determining minimum, maximum, and average values for both far end latency and near end latency from the time stamped data received from the far node over the defined time interval;
- calculating a clock offset for the far node relative to the near node using a minimum value for far end latency and a minimum value for near end latency;
- determining revised minimum, maximum, and average values for far end latency and near end latency from the previously determined values using the calculated clock offset; and
- reporting the revised minimum, maximum, and average values for far end latency and near end latency to a network operator to indicate network performance corresponding to the defined time interval.

* * * * *